(12) United States Patent
Guarnieri et al.

(10) Patent No.: US 8,904,543 B2
(45) Date of Patent: Dec. 2, 2014

(54) DISCOVERY OF APPLICATION VULNERABILITIES INVOLVING MULTIPLE EXECUTION FLOWS

(71) Applicant: International Business Machines Corporation, Armonk, NY (US)

(72) Inventors: Salvatore A. Guarnieri, New York, NY (US); Marco Pistoia, Amawalk, NY (US); Omer Tripp, Har-Adar (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/755,151

(22) Filed: Jan. 31, 2013

(65) Prior Publication Data

US 2014/0157420 A1 Jun. 5, 2014

Related U.S. Application Data

(63) Continuation of application No. 13/705,799, filed on Dec. 5, 2012, now abandoned.

(51) Int. Cl.
| | |
|---|---|
| *H04L 29/06* | (2006.01) |
| *G06F 21/55* | (2013.01) |
| *G06F 21/56* | (2013.01) |
| *G06F 21/57* | (2013.01) |

(52) U.S. Cl.
CPC ............ *G06F 21/577* (2013.01); *G06F 21/55* (2013.01); *G06F 21/562* (2013.01)
USPC .......................................................... 726/25

(58) Field of Classification Search
None
See application file for complete search history.

(56) References Cited

U.S. PATENT DOCUMENTS

| | | | |
|---|---|---|---|
| 5,671,419 | A | 9/1997 | Carini et al. |
| 7,237,265 | B2 | 6/2007 | Reshef et al. |
| 7,617,489 | B2 | 11/2009 | Peyton et al. |
| 8,141,064 | B2 | 3/2012 | Chipman |
| 8,156,483 | B2 | 4/2012 | Berg et al. |
| 2007/0245329 | A1 | 10/2007 | Sankaranarayanan et al. |
| 2008/0301655 | A1 | 12/2008 | Gulwani et al. |
| 2011/0258416 | A1 | 10/2011 | Moritz |
| 2011/0302559 | A1 | 12/2011 | Naik |
| 2012/0151461 | A1 | 6/2012 | Odaira |
| 2013/0282579 | A1* | 10/2013 | Palnitkar et al. ................ 705/44 |

OTHER PUBLICATIONS

"System, Method, and Apparatus for Static Discovery of Insecure Direct Object Reference Vulnerabilities" Authors et. al: Disclosed Anonymously IP.com No. IPCOM000219812D IP.com Electronic Publication: Jul. 17, 2012 pp. 1-3.*

(Continued)

*Primary Examiner* — Hadi Armouche
*Assistant Examiner* — Andrew Steinle
(74) *Attorney, Agent, or Firm* — Tutunjian & Bitetto, P.C.; Anne V. Dougherty

(57) ABSTRACT

Methods and systems for security analysis of an application are disclosed. One system includes a flow-insensitive analyzer, a control flow assessment module and a flow-sensitive analyzer. The flow-insensitive analyzer is configured to conduct a flow-insensitive analysis on the application to obtain a set of potential vulnerabilities in the application. In addition, the control flow assessment module is configured to determine, for each of the potential vulnerabilities, a relevant set of control flows that include the respective vulnerability. Further, the flow-sensitive analyzer is configured to perform, by a hardware processor, for each relevant set of control flows, a flow-sensitive analysis of at least one of the control flows in the corresponding relevant set to assess the validity of the respective vulnerability.

25 Claims, 3 Drawing Sheets

(56) References Cited

OTHER PUBLICATIONS

"Detection of Intrusions and Malware, and Vulnerability Assessment on Race Vulnerabilities in Web Applications" Authors: Roberto Paleari Date: Jul. 10-11, 2008 pp. 126-142 Publisher: Springer Berlin Heidelberg Print ISBN: 978-3-540-70541-3 Online ISBN: 978-3-540-70542-0 Series vol. 5137 Series ISSN: 0302-9743.*

"System, Method and Apparatus for Precise Static Data-flow Analysis of Weakly-typed Languages" Authors et. al.: Disclosed Anonymously IP.com No. IPCOM000205165D IP.com Electronic Publication: Mar. 17, 2011 pp. 1-2.*

Jovanovic, N., et al. "Pixy: A Static Analysis Tool for Detecting Web Application Vulnerabilities" Proceedings of the 2006 IEEE Symposium on Security and Privacy. May 2006. (6 Pages).

Roy, S., et al. "Improving Flowinsensitive Solutions for Nonseparable Dataflow Problems" Proceedings of the 2008 ACM Symposium on Applied Computing (SAC). Mar. 2008. pp. 211-216.

* cited by examiner

DISCOVERY OF APPLICATION VULNERABILITIES INVOLVING MULTIPLE EXECUTION FLOWS

RELATED APPLICATION INFORMATION

This application is a Continuation application of co-pending U.S. patent application Ser. No. 13/705,799 filed on Dec. 5, 2012, incorporated herein by reference in its entirety.

BACKGROUND

1. Technical Field

The present invention relates to security analysis of applications, and, more particularly, to static security analysis of applications.

2. Description of the Related Art

Web applications are both widespread and highly popular. However, web applications are often highly vulnerable, as their interactions with users of the web can provide the users with opportunities to insert malicious code in the applications. As such, this potential has led to increasing interest in static security analysis as an effective compile-time means of discovering web vulnerabilities.

Static analysis tools typically leverage existing program analysis techniques. A particularly useful tool is taint analysis, which provides a way of reducing security analysis to a graph reachability problem. Taint analysis is parameterized by a set of security rules, each rule being a triple <Src,San,Snk> denoting: 1) source statements reading untrusted user inputs (Src); 2) downgrader statements endorsing untrusted data by either validating or sanitizing the data (San); and 3) sink statements performing security-sensitive operations (Snk). Given a security rule r, a flow from a source in $Src_r$ to a sink in $Snk_r$ that does not pass through a downgrader from $San_r$ comprises a potential vulnerability.

A characteristic of standard taint analysis is that its design assumes a single control flow. Thus, to track the flow of tainted data arising at a source statement, the analysis propagates this data along control-flow edges until reaching a fixpoint.

SUMMARY

One embodiment is directed to a method for security analysis of an application. In accordance with the method, a flow-insensitive analysis is conducted on the application to obtain a set of potential vulnerabilities in the application. For each of the potential vulnerabilities, a relevant set of control flows that include the respective vulnerability is determined. Further, for each relevant set of control flows, a flow-sensitive analysis of at least one of the control flows in the corresponding relevant set is performed by a hardware processor to assess the validity of the respective vulnerability.

Another embodiment is directed to a method for security analysis of a web application. In the method, a flow-insensitive analysis is conducted on the application to obtain a set of potential witnesses of vulnerabilities in the application. For each of the potential witnesses, a scope of analysis within program code of the application is restricted to a relevant set of control flows. For at least one of the relevant sets of control flows, a flow-sensitive analysis of a concatenation of the control flows in the corresponding relevant set is performed by a hardware processor to assess the validity of the respective witness across multiple executions of the web application.

Another embodiment is also directed to a method for security analysis of an application. In accordance with the method, a flow-insensitive analysis is conducted on the application to obtain a set of potential vulnerabilities in the application. For at least one of the potential vulnerabilities, a relevant sequence of control flows that enable source to sink data propagation is determined. For at least one relevant sequence of control flows, a flow-sensitive analysis of a concatenation of a plurality of control flows in the corresponding relevant sequence is performed to assess the validity of the respective vulnerability.

An alternative embodiment is directed to a system for security analysis of an application. The system includes a flow-insensitive analyzer, a control flow assessment module and a flow-sensitive analyzer. The flow-insensitive analyzer is configured to conduct a flow-insensitive analysis on the application to obtain a set of potential vulnerabilities in the application. In addition, the control flow assessment module is configured to determine, for each of the potential vulnerabilities, a relevant set of control flows that include the respective vulnerability. Further, the flow-sensitive analyzer is configured to perform, by a hardware processor, for each relevant set of control flows, a flow-sensitive analysis of at least one of the control flows in the corresponding relevant set to assess the validity of the respective vulnerability.

Another embodiment is directed to a computer readable storage medium comprising a computer readable program for security analysis of a web application, where the computer readable program when executed on a computer causes the computer to perform a series of steps including: conducting a flow-insensitive analysis on the application to obtain a set of potential witnesses of vulnerabilities in the application; for each of the potential witnesses, restricting a scope of analysis within program code of the application to a relevant set of control flows; and for at least one of the relevant sets of control flows, performing a flow-sensitive analysis of a concatenation of the control flows in the corresponding relevant set to assess the validity of the respective witness across multiple executions of the web application.

Another embodiment is directed to a system for security analysis of an application. The system includes a flow-insensitive analyzer, a control flow assessment module and a flow-sensitive analyzer. The flow-insensitive analyzer is configured to conduct a flow-insensitive analysis on the application to obtain a set of potential vulnerabilities in the application. In addition, the control flow assessment module is configured to determine, for at least one of the potential vulnerabilities, a relevant sequence of control flows that enable source to sink data propagation. Further, the flow-insensitive analyzer is configured to perform, by a hardware processor, for at least one relevant sequence of control flows, a flow-sensitive analysis of a concatenation of a plurality of control flows in the corresponding relevant sequence to assess the validity of the respective vulnerability.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
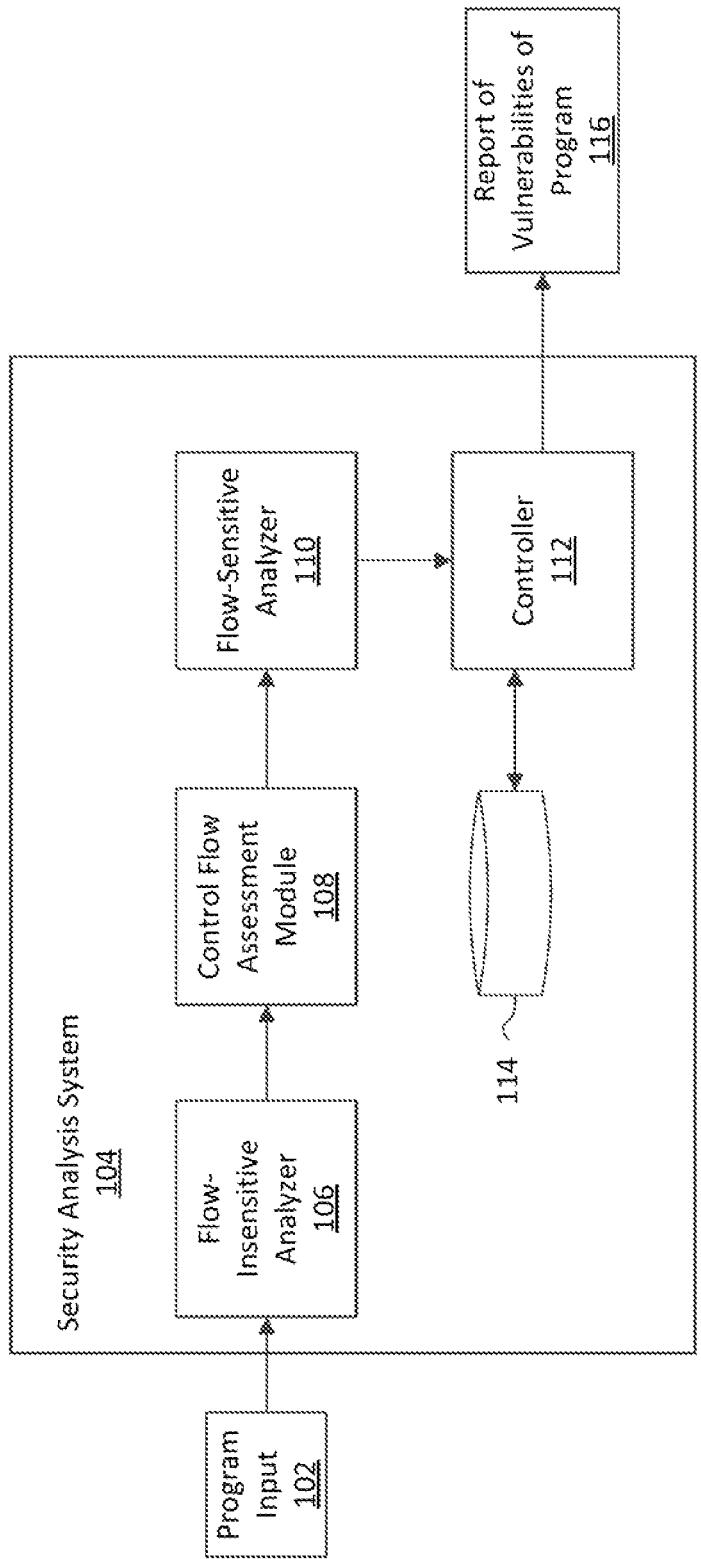
FIG. 1 is a high-level block/flow diagram of a system for security analysis of an application in accordance with exemplary embodiments of the present principles.

As indicated above, a key limitation of standard taint analysis is that its design assumes a single control flow, where the analysis propagates data that is potentially tainted at a source statement along control-flow edges until the analysis reaches a fixpoint. However, restricting the analysis to single execution flows, without accounting for vulnerabilities spanning a series of interactions with the subject web application, is an important source of unsoundness, as the analysis may miss true and critical vulnerabilities. This is not at all a theoretical concern. An important foundation in the design of web applications is the ability to maintain a persistent state through, for example, cookies, the session object, backend databases, etc. Otherwise web interaction would be stateless, and thus of limited functional value.

Attackers frequently make malicious use of the persistent state, for example, by injecting a security payload into the session object in one round of interaction, then triggering the retrieval and processing of the payload via an additional interaction(s) with the web application. One solution for detecting vulnerabilities of this sort using static analysis is to relinquish flow sensitivity in the analysis. For example, in this case, the analysis abstracts away the control-flow structure of the subject application and processes the effect of all statements without being sensitive to control restrictions on ordering between the statements. This indeed enables discovery of vulnerabilities involving multiple control flows, as taint propagation is considered along all possible "directions" through the code. However, the processing cost is very high, as the analysis now reports many more spurious vulnerabilities compared to a flow-sensitive analysis.

Table 1, below, provides a simple example illustrating the problems with this type of analysis. The "name" attribute stored in the session object is overwritten with a constant value prior to having its value rendered to the response HTML. This makes the code in Table 1 safe. However, a flow-insensitive analysis, which abstracts away the order of assignments to the "name" attribute, would wrongly conclude that the code is vulnerable.

TABLE 1

A program with which a flow-insensitive analysis yields a spurious vulnerability

```
String name = request.getParameter("name"); // Source
response.getSession( ).set("name", name);
...
response.getSession( ).set("name", "admin");
...
response.getWriter( ).write(
    response.getSession( ).getAttribute("name")); // Sink
```

Embodiments of the present principles described herein are directed to methods and systems for detecting multi-flow vulnerabilities. In particular, the embodiments provide a means for detecting vulnerabilities in an application due to multiple, separate interactions with a user that is both efficient and complete. Specifically, the methods described herein are as accurate as flow-sensitive analysis, and are as complete as flow-insensitive analysis.

An important aspect of the exemplary approaches described herein below is the use of the flow-insensitive analysis as guidance for a flow-sensitive analysis conducted on the code of an application. For example, the system first runs a flow-insensitive analysis, yielding a report R. For each vulnerability in R, the system restricts the scope of analysis to relevant portions within the program. For example, the system determines which control flows $c_1 \ldots c_k$ in the program support source-to-sink data propagation. Further, for each sequence $c_1 \ldots c_k$ of control flows accounting for a vulnerability, the system runs a flow-sensitive analysis on the concatenation $c_1 \ldots c_k$ of these flows. Here, each of the control flows $c_1 \ldots c_k$ in the concatenation may denote a separate interaction of the application with a user, thereby enabling the system to efficiently account for potential vulnerabilities that a standard taint analysis described above, which assumes a single control flow, cannot detect.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be further noted that references in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well as any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Referring now to the drawings in which like numerals represent the same or similar elements and initially to FIG. 1, a system 104 for security analysis of an application in accordance with an exemplary embodiment of the present principles is illustratively depicted. The system 104 can include a flow-insensitive analyzer 106, a control flow assessment module 108, a flow-sensitive analyzer 110 and a controller 112. It should be noted that each of the elements 106-112 can be implemented by one or more hardware processors. For example, each of the elements 104-112 can be implemented by one or more hardware processors configured to execute program code of software stored on a storage medium 114. For example, the program code can incorporate steps of method embodiments described in more detail herein below. Generally, the flow-insensitive analyzer 106 can be configured to receive a program input 102 including code of an application, such as a web application, and to conduct a flow-insensitive analysis on the code, as discussed in more detail herein below. The result of the analysis is provided to the control flow assessment module 108, which restricts the scope of the program to be analyzed by the flow-sensitive analyzer 110. The flow-sensitive analyzer 110 then performs a flow-sensitive analysis on the scope provided by the module 108 to capture vulnerabilities in the program, which can include vulnerabilities stemming from multiple execution flows. In turn, the controller 112 compiles the vulnerabilities and outputs a report 116 of the vulnerabilities of the program. Details of the functions of the various elements of the system 104 are described herein below with respect to method embodiments.

To illustrate the operation of exemplary security analysis techniques in accordance with embodiments of the present principles, reference is made to Table 2, below, depicting an exemplary program including a multi-flow vulnerability. For this example, a flow-insensitive analysis would flag two multi-flow vulnerabilities. The first vulnerability is denoted as [I-Spurious]. For [I-Spurious], one starts at the getParameter("name") call in NewUserServlet, and ends at the first sink call in ProcessActionServlet. This is a false finding, as the value of parameter "name" is overwritten already in NewUserServlet. The second vulnerability is denoted as [II-Real]. Here, the second flow starts at getParameter("surname"). This flow highlights a real vulnerability. In this case, the untrusted data to which the "surname" attribute maps is not overwritten and survives up to the sink call, which renders the payload to the response HTML. In the approaches described herein below, the distinction between these two reports will be captured accurately and correctly by the analysis.

TABLE 2

A program containing a multi-flow vulnerability

```
/* in NewUserServlet.java */
String name = request.getParameter("name"); // Source
String surname = request.getParameter("name"); // Source
response.getSession( ).set("name", name);
response.getSession( ).set("surname", name);
...
response.getSession( ).set("name", "admin");
...
/* in ProcessActionServlet.java */
...
response.getWriter( ).write(
      response.getSession( ).getAttribute("name")); // Sink
...
String name = response.getSession( ).getAttribute("name");
String surname =
      response.getSession( ).getAttribute("surname")
      response.getWriter( ).write(name); // Sink
      response.getWriter( ).write(surname); // Sink
...
```

Figure 2:
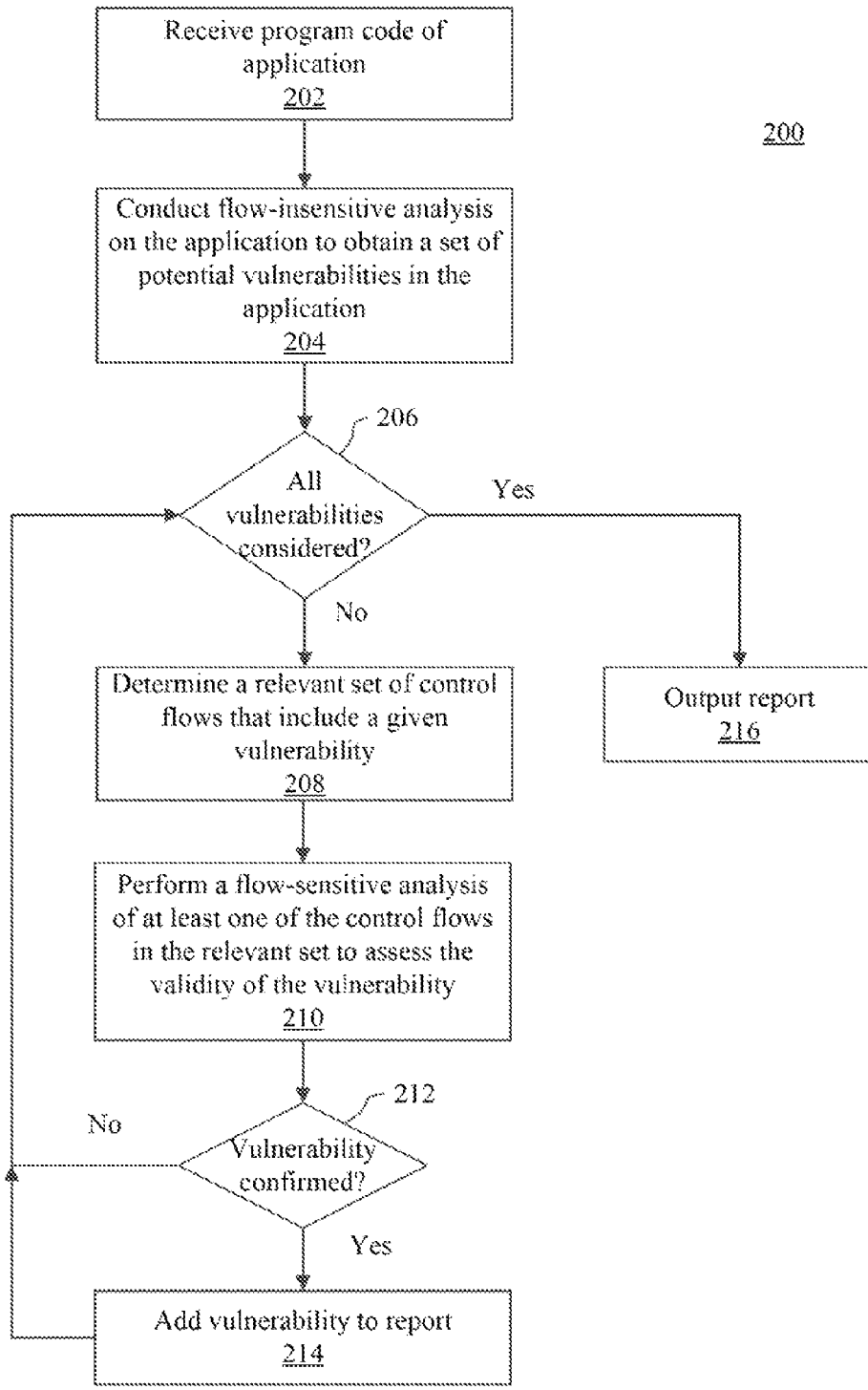
FIG. 2 is a high-level flow diagram of a method for security analysis of an application in accordance with exemplary embodiments of the present principles.

Referring now to FIG. 2, with continuing reference to FIG. 1 and Table 2, an exemplary method 200 for security analysis of an application in accordance with exemplary embodiments is respectively depicted. The method can begin at step 202, at which the flow-insensitive analyzer 106 can receive program code 102. For example, the program can be a parallel program web application, such as the program illustrated in Table 2 above. However, it should be noted that the application can be any application in which remote or unauthenticated users can input malicious code into the application through interactions with the application.

At step 202, the flow-insensitive analyzer 106 can conduct a flow-insensitive analysis on the application 102 to obtain a set of potential vulnerabilities in the application. For example, the flow-insensitive analyzer 106 can apply a flow-insensitive analysis $S_1$ on the program P 102 to obtain a set of potential witnesses of vulnerabilities in the program. Here, the witnesses can include the specific source statements and/or flows in the application 102 that may lead to potential security vulnerabilities. For example, for the program of Table 2, step 202 can produce a report containing both [I-Spurious] and [II-Real]. The flow insensitive analysis detects when tainted data, such as that provided by an untrusted user, is written to an object. The analysis then tracks that data through assignments and function calls until it detects that a tainted object is being used in a sink.

In response to receiving the report from the flow-insensitive analyzer 106, the control flow assessment module 108, the flow-sensitive analyzer 110 and the controller 112 can iteratively assess each potential vulnerability/witness denoted by the report. For example, at step 206, the controller 112 can determine whether all vulnerabilities or witnesses indicated in the report provided by the flow-insensitive analyzer 106 have been assessed. If not, then the method can proceed to step 208.

At step 208, the control flow assessment module 108 can construct a limited scope within the program 102 for analysis of the vulnerability or witness. For example, the control flow assessment module 108 can determine a relevant set of control flows that include the respective vulnerability/witness. To determine the relevant set, the control flow assessment module 108 can determine and select all control flows that support or enable sink to source data propagation. The set can include a sequence of control flows $c_1 \ldots c_k$, at least a subset of which denote separate, temporal interactions between a user and the application that occur at different times. For example, in the program of Table 2, the execution of the entry point of NewUserServlet can be one control flow that is succeeded by running the ProcessActionServlet's entry point, which is another control flow. It should be noted that a relevant set of control flows determined for a given vulnerability or witness can include more than one sequence of control flows. In addition, a given control flow in the set can be included in more than one sequence of control flows. Thus, various control flows can be concatenated in one or more ways. Further, in certain cases, the set of control flows may consist of one control flow. In accordance with one exemplary aspect, all control flows that lead from a source to a sink would be relevant. In addition, in one example, every relevant set of control flows will have $c_1$ that includes a source and $c_k$ that includes a sink for the source, with the possibility that control flows therebetween can also have sources and sinks.

At step 210, the flow-sensitive analyzer 110 can perform a flow-sensitive analysis of at least one of the control flows in the relevant set to assess the validity of the respective vulnerability. For example, the flow-sensitive analyzer 110 can apply a flow sensitive analysis $S_2$ to the limited scope determined at step 208. Here, at step 210, to assess the validity of the respective witness across multiple executions of the application, the flow-sensitive analyzer 110 can perform the flow sensitive analysis on a concatenation of at least a plurality of the control flows $c_1 \ldots c_k$ in a corresponding relevant set or sequence determined at step 208. If there are a plurality of sequences in the relevant set of control flows, then the flow-sensitive analyzer 110 can perform the flow sensitive analysis on each concatenation of the respective sequences. Further, as noted above, a plurality of the control flows in a concatenation can denote multiple executions of the application. In addition, as also noted above, the multiple executions can denote temporally separate interactions with a user. Step 210 can be implemented for each vulnerability or witness and, hence, for each relevant set of control flows determined for the respective vulnerability or witness. However, it should be noted that not all sets of relevant control flows found at iterations of step 208 necessarily include multiple interactions with a user or a sequence of control flows, as these qualities will depend on the particular characteristics of the program that is analyzed by the method.

It should be noted that a flow sensitive analysis takes instruction order and structure into account while the analysis is executing. For example, in Table 1, the name value is set using the set method. In accordance with one example, a flow sensitive analysis will only analyze parts of the program that follow this instruction. Since getAttribute follows the set method call, it will be analyzed. Furthermore, since the order of instructions is being investigated, an instruction that removes tainted data will remove a flow. Because there is a second set command following the first one (that introduced tainted data), the second set command removes the tainted data along this flow-sensitive-control-flow and thus removes the control flow, preventing it from being reported as a vulnerability.

At step 212, the controller 112 can determine whether the vulnerability or witness, respectively, has been confirmed. For example, the controller 112 can determine whether the respective vulnerability or witness is reproduced by $S_2$. For example, returning to the example of Table 2, at step 210, the flow-sensitive analyzer 110 can track data propagation across the two servlets NewUserServlet and ProcessActionServlet's precisely (i.e., in a flow-sensitive manner), thereby permitting the controller 112 to conclude that [I-Spurious] is a false vulnerability.

If the vulnerability or witness is not confirmed, then the controller 112 proceeds to step 206 and repeats the respective method for another vulnerability or witness reported by the flow-insensitive analyzer 106. If the vulnerability or witness is confirmed, then the controller 112 adds the vulnerability or witness to the output report 116 at step 214, respectively. Thereafter, the method proceeds to step 206 and can be repeated for another vulnerability or witness reported by the flow-insensitive analyzer 106. If at step 206 the controller 112 determines that all vulnerabilities or witnesses provided in the report compiled by the flow-insensitive analyzer 106 have been considered, then the controller 112 can output the report 116 indicating the vulnerabilities or witnesses for the program at step 216.

Thus, by conducting a flow sensitive analysis on concatenations of control flows denoting separate interactions of the application with one or more users found by using a flow insensitive analysis as a guide, embodiments of the present principles efficiently accounts for potential vulnerabilities that standard taint analyses cannot detect.

Figure 3:
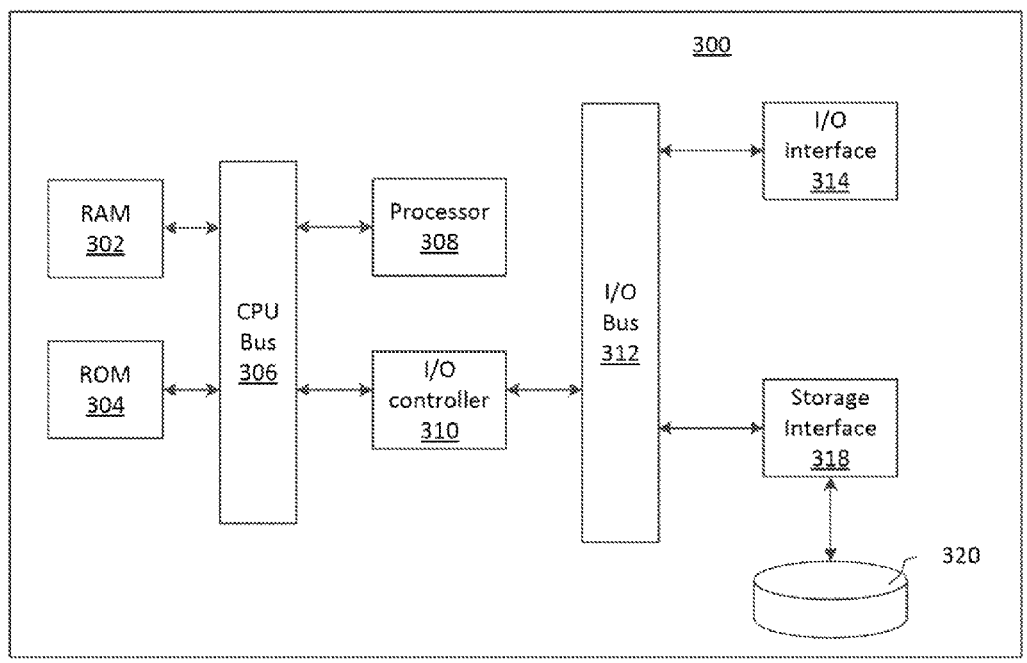
FIG. 3 is a high-level block diagram of a computing system by which method and system embodiments of the present principles can be implemented.

With reference now to FIG. 3, an exemplary computing system 300 by which system and method embodiments of the present principles described above can be implemented is illustrated. The computing system 300 includes a hardware processor 308 that can access random access memory 302 and read only memory 304 through a central processing unit bus 306. In addition, the hardware processor 308 can also access a storage medium 320 through an input/output controller 310, an input/output bus 312 and a storage interface 318, as illustrated in FIG. 3. For example, software instructions implementing method 200 can be stored in and accessed form the storage medium 320. The system 300 can also include an input/output interface 314, which can be coupled to a display device, keyboard, mouse, touch screen, external drives or storage mediums, etc., for the input and output of data to and from the system 300. For example, the application code 102 described above can be input into the system 300 through the interface 314. In accordance with one exemplary embodiment, the processor 308 can access the software instructions stored in the storage medium 320 and can access memories 302 and 304 to run the software and thereby implement method 200 described above. In addition, the processor 308 can implement each of the system elements described above, such as the flow-insensitive analyzer 106, the control flow assessment module 108, the flow-sensitive analyzer 110 and the controller 112. Alternatively, each of these system elements can be implemented via a plurality of processors 308.

Having described preferred embodiments of a systems and methods for discovering application vulnerabilities involving multiple execution flows (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A system for security analysis of an application comprising:
   a flow-insensitive analyzer configured to conduct, by a hardware processor, a flow-insensitive analysis on the application to obtain a set of potential vulnerabilities in the application without being sensitive to control restrictions on ordering between a serve call and sink call;
   a control flow assessment module configured to determine, by a hardware processor, for each of the potential vulnerabilities, a relevant set of control flows that include the respective vulnerability; and
   a flow-sensitive analyzer configured to perform, by a hardware processor, for each relevant set of control flows, a flow-sensitive analysis of at least one of the control flows in the corresponding relevant set to assess a validity of the respective vulnerability, wherein the flow sensitive analysis is analyzing instructional order and structure of a series of data in the control flows from the serve call to the sink call between at least two servlets in assessing the validity of the respective vulnerability.

2. The system of claim 1, wherein flow-sensitive analyzer is configured to perform the flow sensitive analysis on a concatenation of control flows in at least one of the relevant sets.

3. The system of claim 2, wherein a plurality of the control flows in the concatenation denote multiple executions of the application.

4. The system of claim 3, wherein the multiple executions denote separate interactions with a user.

5. The system of claim 4, wherein the application is a parallel program web application.

6. The system of claim 1, wherein the control flow assessment module is configured to determine a set of control flows that enable source to sink data propagation.

7. The system of claim 1, further comprising:
   a controller configured to determine, for each of the vulnerabilities, whether the respective vulnerability is reproduced by the flow sensitive analysis.

8. The system of claim 7, wherein the controller is further configured to output a report denoting each of the respective vulnerabilities that are reproduced by the flow sensitive analysis.

9. A non-transitory computer readable storage medium comprising a computer readable program for security analysis of a web application, wherein the computer readable program when executed on a computer causes the computer to perform the steps of:
   conducting a flow-insensitive analysis on the application to obtain a set of potential vulnerabilities in the application without being sensitive to control restrictions on ordering between the statements;
   for each of the potential vulnerabilities, restricting a scope of analysis within program code of the application to a relevant set of control flows; and
   for at least one of the relevant sets of control flows, performing a flow-sensitive analysis of a concatenation of the control flows in the corresponding relevant set to assess a validity of the respective witness across multiple executions of the web application, wherein the flow sensitive analysis is analyzing instructional order and structure of a series of data in the control flows from the serve call to the sink call between at least two servlets in assessing the validity of the potential vulnerabilities.

10. The computer readable storage medium of claim 9, wherein a plurality of the control flows in the concatenation denote the multiple executions of the web application.

11. The computer readable storage medium of claim 10, wherein the multiple executions denote separate interactions with a user.

12. The computer readable storage medium of claim 9, wherein the restricting the scope of analysis further comprises determining a set of control flows that enable source to sink data propagation.

13. The computer readable storage medium of claim 9, wherein the steps further comprise:
for each of the witnesses, determining whether the respective witness is reproduced by the flow-sensitive analysis.

14. The computer readable storage medium of claim 13, wherein the steps further comprise:
outputting a report denoting each of the respective witnesses that are reproduced by the flow sensitive analysis.

15. A system for security analysis of an application comprising:
a flow-insensitive analyzer configured to conduct, by a hardware processor, a flow-insensitive analysis on the application to obtain a set of potential vulnerabilities in the application without being sensitive to control restrictions on ordering between a serve call and a sink call;
a control flow assessment module configured to determine, by a hardware processor, for at least one of the potential vulnerabilities, a relevant sequence of control flows that enable source to sink data propagation; and
a flow sensitive analyzer configured to perform, by a hardware processor, for at least one relevant sequence of control flows, a flow-sensitive analysis of a concatenation of a plurality of control flows in the corresponding relevant sequence to assess a validity of the respective vulnerability, wherein the flow sensitive analysis is analyzing instructional order and structure of a series of data in the control flows from the serve call to the sink call between at least two servlets in assessing the validity of the respective vulnerability.

16. The system of claim 15, wherein a plurality of the control flows in the concatenation denote multiple executions of the application.

17. The system of claim 16, wherein the multiple executions denote separate interactions with a user.

18. The system of claim 17, wherein the application is a parallel program web application.

19. The system of claim 15, further comprising:
a controller configured to determine, for each of the vulnerabilities, whether the respective vulnerability is reproduced by the flow sensitive analysis.

20. The system of claim 19, wherein the controller is further configured to output a report denoting each of the respective vulnerabilities that are reproduced by the flow-sensitive analysis.

21. A method for security analysis of an application comprising:
conducting a flow-insensitive analysis by a hardware processor on the application to obtain a set of potential vulnerabilities in the application without being sensitive to control restrictions on ordering between a serve call and sink call;
for each of the potential vulnerabilities, determining a relevant set of control flows by a hardware processor that include the respective vulnerability; and
for each relevant set of control flows, performing, by a hardware processor, a flow-sensitive analysis of at least one of the control flows in the corresponding relevant set to assess a validity of the respective vulnerability, the flow sensitive analysis analyzing instructional order and structure of a series of data in the control flows from the serve call to the sink call in assessing the validity of the respective vulnerability.

22. The method of claim 21, wherein the application is a parallel program web application.

23. A method for security analysis of a web application comprising:
conducting a flow-insensitive analysis by a hardware processor on the application to obtain a set of potential witnesses of vulnerabilities in the application without being sensitive to control restrictions on ordering between a serve call and sink call;
for each of the potential witnesses, restricting with a hardware processor a scope of analysis within program code of the application to a relevant set of control flows; and
for at least one of the relevant sets of control flows, performing, by a hardware processor, a flow-sensitive analysis of a concatenation of the control flows in the corresponding relevant set to assess a validity of the respective witness across multiple executions of the web application, the flow sensitive analysis analyzing instructional order and structure of a series of data in the control flows from the serve call to the sink call in assessing the validity of the respective vulnerability.

24. A method for security analysis of an application comprising:
conducting a flow-insensitive analysis by a hardware processor on the application to obtain a set of potential vulnerabilities in the application without being sensitive to control restrictions on ordering between a serve call and sink call;
for at least one of the potential vulnerabilities, determining a relevant sequence of control flows by a hardware processor that enable source to sink data propagation; and
for at least one relevant sequence of control flows, performing, by a hardware processor, a flow-sensitive analysis of a concatenation of a plurality of control flows in the corresponding relevant sequence to assess a validity of the respective vulnerability, the flow sensitive analysis analyzing instructional order and structure of a series of data in the control flows from the serve call to the sink call in assessing the validity of the respective vulnerability.

25. The method of claim 24, wherein the application is a parallel program web application.

* * * * *